United States Patent
Zheng

(10) Patent No.: US 11,317,620 B2
(45) Date of Patent: May 3, 2022

(54) WATER LANCE PROVIDED WITH DIAPHRAGM PUMP

(71) Applicant: Yuping Zheng, Guangdong (CN)

(72) Inventor: Yuping Zheng, Guangdong (CN)

( * ) Notice: Subject to any disclaimer, the term of this patent is extended or adjusted under 35 U.S.C. 154(b) by 0 days.

(21) Appl. No.: 15/931,612

(22) Filed: May 14, 2020

(65) Prior Publication Data

US 2021/0219537 A1     Jul. 22, 2021

(30) Foreign Application Priority Data

Jan. 19, 2020 (CN) .......................... 202020133145.X

(51) Int. Cl.
    *F04B 43/02*     (2006.01)
    *A01M 7/00*     (2006.01)
    *F04B 43/04*     (2006.01)

(52) U.S. Cl.
    CPC ........... *A01M 7/0032* (2013.01); *F04B 43/04* (2013.01)

(58) Field of Classification Search
    CPC ........ F04B 43/04; F04B 43/026; F04B 43/14; B05B 9/0861; B05B 9/0855; B05B 9/0888; A47K 5/14; A01M 7/0032
    USPC .............................. 222/333, 464.4, 334, 214
    See application file for complete search history.

(56) References Cited

U.S. PATENT DOCUMENTS

| | | | | |
|---|---|---|---|---|
| 3,547,296 A | * | 12/1970 | Greenberg | A61J 9/006 215/11.4 |
| 3,993,250 A | * | 11/1976 | Shure | B05B 9/0861 239/332 |
| 5,150,841 A | * | 9/1992 | Silvenis | B05B 9/0861 239/332 |
| 5,195,664 A | * | 3/1993 | Rhea | B05B 11/0059 222/464.4 |
| 5,716,007 A | * | 2/1998 | Nottingham | B05B 9/0861 239/332 |
| 5,873,474 A | * | 2/1999 | Gray | A61J 9/00 215/11.1 |
| 6,394,319 B1 | * | 5/2002 | Pucillo | A61J 9/00 222/383.1 |
| 7,318,539 B2 | * | 1/2008 | Vitantonio | B05B 9/0861 222/333 |
| 2008/0008979 A1 | * | 1/2008 | Thomas | A61C 17/0205 433/80 |
| 2011/0144588 A1 | * | 6/2011 | Taylor | A61M 3/0208 604/151 |
| 2017/0197225 A1 | * | 7/2017 | Zheng | F04B 43/04 |

(Continued)

*Primary Examiner* — Charles P. Cheyney

(57) ABSTRACT

A water lance provided with a diaphragm pump comprises a nozzle, a lance body and a water absorption ball. A diaphragm pump and a motor for driving the diaphragm pump are disposed in the lance body. The diaphragm pump drives water to be absorbed by the water absorption ball and to be sprayed by the nozzle, and comprises a rotating assembly, a swing component, a diaphragm assembly and a housing. The rotating assembly has an end connected to the motor and an end connected to the diaphragm assembly through the swing component. A pump chamber is formed by the diaphragm assembly and the housing. A split-type diaphragm pump is used as a liquid pump of a spraying facility, and all separated components are fixed through clamp springs and are assembled or disassembled step by step, so that parts can be replaced specifically, and later maintenance is facilitated.

7 Claims, 4 Drawing Sheets

(56) References Cited

U.S. PATENT DOCUMENTS

2018/0235410 A1* 8/2018 Ciavarella ........... B05B 11/3087
2018/0289223 A1* 10/2018 Harris .................. A47K 5/1217

* cited by examiner

WATER LANCE PROVIDED WITH DIAPHRAGM PUMP

BACKGROUND OF THE INVENTION

The invention relates to the technical field of pesticide and chemical spraying equipment, in particular to a water lance provided with a diaphragm pump.

Pesticides and chemicals are generally sprayed to be used, and in this process, a pressure is applied to liquid to enlarge of the coverage of the pesticides and chemicals, so that time and labor are saved, and the pesticides and chemicals can have their effects brought into full play and are widely applied to agriculture and industry.

Existing spraying facilities typically adopt a gear pump or a plunger pump to pump liquid. On the one hand, such pumps may be corroded by pesticides and chemicals and thus have a short service life, and even, the pesticides and chemicals cannot be normally sprayed out due to the impact of the viscous pesticides and chemicals on some drive mechanisms, thus, affecting normal operation of the facilities. On other hand, such pumps have complicated mechanical structures, and are difficult to assemble, large in friction, low in work efficiency and high in energy consumption.

There are also some existing spraying facilities that adopt a diaphragm pump. However, the motor and the pump body of these spraying facilities are of an integral structure, the motor often breaks down previous to the pump body, and in this case, both the motor and the pump body have to be abandoned because independent replacement of the motor is unavailable, thus resulting in waste and increasing costs.

Hence, improvements should be made to overcome the above-mentioned defects.

BRIEF SUMMARY OF THE INVENTION

To overcome the defects of the prior art, the invention provides a water lance provided with a diaphragm pump.

The technical solution adopted by the invention is as follows:

A water lance provided with a diaphragm pump comprises a nozzle, a lance body and a water absorption ball, wherein a diaphragm pump is disposed in the lance body and has an end connected to the water absorption ball and an end connected to the nozzle, the diaphragm pump is detachably connected to a motor and comprises a rotating assembly, a swing component, a diaphragm assembly and a housing, the housing is provided with clamp springs, the rotating assembly has an end connected to the motor and an end connected to the diaphragm assembly by means of the swing component, and a pump chamber is formed by the diaphragm assembly and the housing.

According to the water lance provided with a diaphragm pump, the water absorption ball is connected to the diaphragm pump by means of a water inlet pipe.

According to the water lance provided with a diaphragm pump, the nozzle is connected to the diaphragm pump by means of a water outlet pipe, and a water outlet valve is disposed on the water outlet pipe and is connected to a slide switch which controls the on-off state of the water outlet valve.

Furthermore, a valve spool in the water outlet valve is provided with a piston which stretches out of the surface of a valve body of the water outlet valve, and the slide switch is connected to a slider, and the slider is connected to the piston and pushes the valve spool by means of the piston to control the on-off state of the water outlet valve.

Furthermore, the slider has a sliding groove, and the piston is slidably connected to the sliding groove.

Furthermore, a micro-switch is disposed in the lance body and is used to connect the motor to a power supply, the slide switch synchronously drives the water outlet valve and the micro-switch, and the micro-switch drives the motor to start.

According to the water lance provided with a diaphragm pump, the water inlet pipe is provided with a threaded cover fixed to a liquid container.

According to the water lance provided with a diaphragm pump, a spacer made of a corrosion-resistant material is disposed between the pump chamber and the water outlet valve.

According to the water lance provided with a diaphragm pump, the power supply is disposed in the lance body and is connected to the motor.

According to the water lance provided with a diaphragm pump, the rotating assembly comprises a rotating shaft and a driving shaft, wherein the rotating shaft is connected to the motor, a mounting hole is formed in a non-central position of an upper end face of the rotating shaft, the driving shaft has an end inserted into the mounting hole to be connected to the rotating shaft and an end disposed on the axis of the rotating shaft, and the motor drives the driving shaft to rotate by means of the rotating shaft.

According to the water lance provided with a diaphragm pump, the swing component comprises a connecting part connected to the diaphragm assembly and a protrusion part connected to the driving shaft.

According to the water lance provided with a diaphragm pump, the diaphragm assembly comprises a water inlet valve plate, a silica gel cavity opposite to the water inlet valve plate, and a water outlet valve plate, wherein the water inlet valve plate is disposed above a cavity body of the silica gel cavity, the water outlet valve plate is disposed below a water outlet of the pump chamber, and the silica gel cavity is inserted into the connecting part of the swing component to connect the diaphragm assembly to the swing component.

Furthermore, when the silica gel cavity is stretched, the water inlet valve plate is opened, and the water outlet valve plate is closed; or, when the silica gel cavity is squeezed, the water inlet valve plate is closed, and the water outlet valve plate is opened.

According to the water lance provided with a diaphragm pump, the housing comprises a top cover, a middle shell, a fixing shell and an outer shell from top to bottom, and the top cover, the middle shell, the fixing shell and the outer shell are connected in a buckled manner;

The top cover has a port via which the water inlet pipe is connected to the water outlet valve;

The pump chamber is defined by the diaphragm assembly, the middle shell and the top cover, and an elastic gasket is disposed between the diaphragm assembly and the middle shell;

The fixing shell is provided with multiple diaphragm plates for fixing the diaphragm assembly, and a plate part of the diaphragm assembly is closely attached to the diaphragm plates to enable the diaphragm assembly to penetrate through the diaphragm plates to be fixed in the fixing shell; and the rotating assembly is disposed in a space defined by the outer shell and the motor.

According to the water lance provided with a diaphragm pump, the housing is of a multi-layer structure, a plurality of grooves are formed in the circumferential surface of the housing, and the clamp springs are inlaid in the grooves and are used to fix the housing.

Furthermore, protrusions at two ends of each clamp spring are inlaid in the housing.

By adoption of the above technical solution, the invention has the following beneficial effects: a split-type diaphragm pump is used as a liquid pump of a spraying facility, and all separated components are fixed by means of clamp springs and are assembled or disassembled step by step, so that parts can be replaced specifically, later maintenance is facilitated, and costs are saved. In addition, the diaphragm pump has good corrosion resistance, aging resistance and a few drive structures, and is simple in structure, easy to assemble, small in friction and high in work efficiency.

BRIEF DESCRIPTION OF THE DRAWINGS

To more clearly explain the technical solutions of the embodiments of the invention, the accompanying drawings required for the description of the embodiments or the prior art are briefly introduced below. Obviously, the drawings in the following description are only for some embodiments of the invention, and those ordinarily skilled in the art can obtain other drawings according to the following ones without creative labor.

Figure 1:
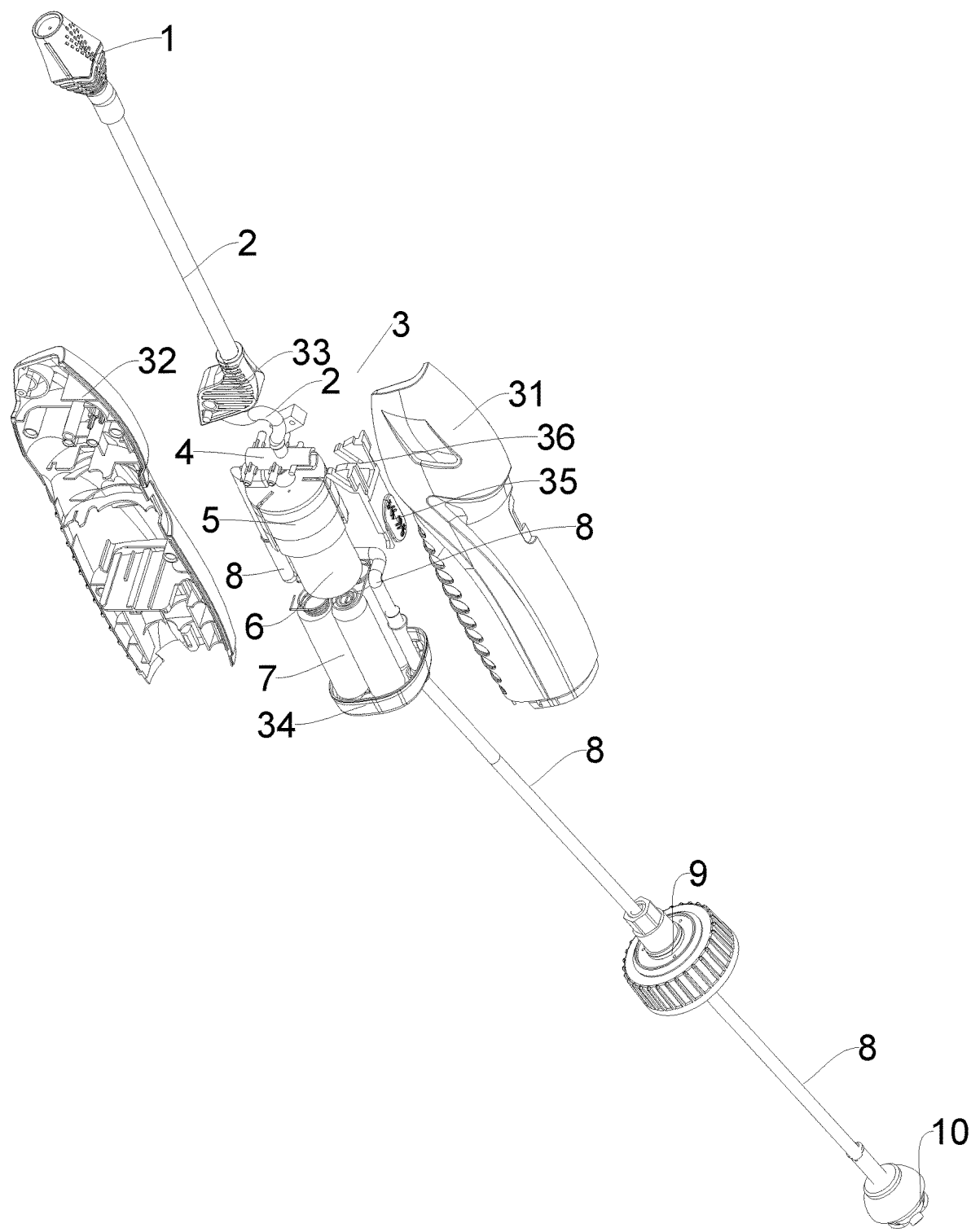
FIG. 1 is an exploded view of the invention.

REFERENCE SIGNS IN THE FIGURES 1, nozzle; 2, water outlet pipe; 3, lance body; 31, upper shell; 32, lower shell; 33, water outlet; 34, bottom shell; 35, slide switch; 36, slider; 361, sliding groove; 37, micro-switch; 4, water outlet valve; 41, valve spool; 42, piston; 5, diaphragm pump; 51, top cover; 52, middle shell; 53, fixing shell; 54, outer shell; 55, clamp spring; 56, rotating assembly; 561, rotating shaft; 562, driving shaft; 57, swing component; 58, diaphragm assembly; 581, water inlet valve plate; 582, silica gel cavity; 583, water outlet valve plate; 59, elastic gasket; 6, motor; 7, power supply; 8, water inlet pipe; 9, threaded cover; 10, water absorption ball.

DETAILED DESCRIPTION OF THE INVENTION

For the sake of a better understanding of the technical issues to be settled by the invention as well as the technical solutions and beneficial effects of the invention, the invention is further expounded below in conjunction with the accompanying drawings and embodiments. Understandably, the specific embodiments described hereinafter are only used to explain the invention, and are not intended to limit the invention.

It should be noted that when one component is referred to as being "connected to" another component, this component is directly or indirectly connected to the other component. The terms "upper", "lower", "top", "bottom", "inner" and "outer" are used to indicate directions or positions on the basis of the accompanying drawings to facilitate the description, and should not be appreciated as limitations of the technical solutions of the invention. Unless otherwise specifically defined, "multiple" refers to two or more. Unless otherwise specifically defined, "a plurality of" refers to one or more.

Figure 2:
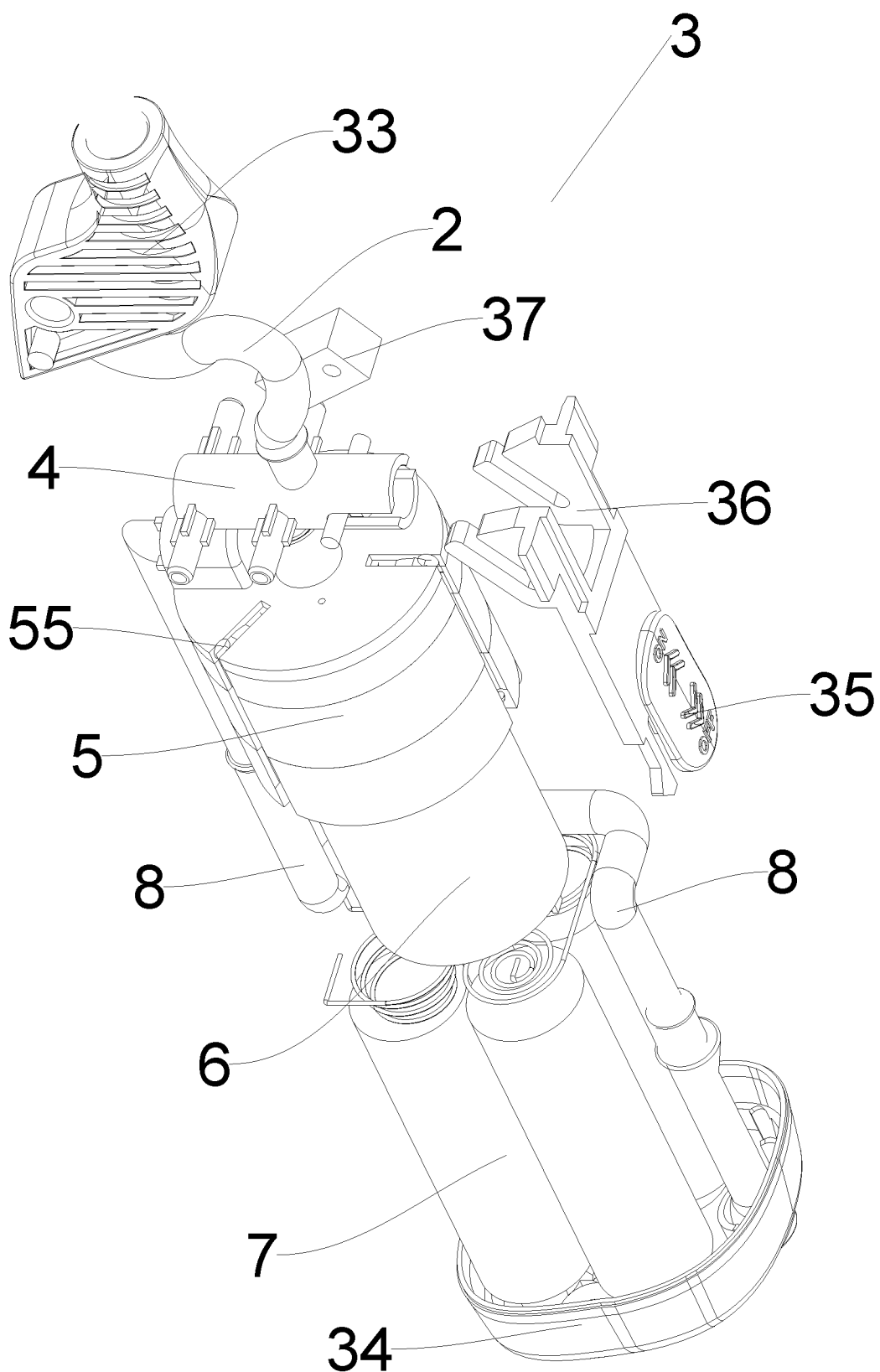
FIG. 2 is a partial enlarged view of FIG. 1.

A water lance provided with a diaphragm pump, as shown in FIG. 1 and FIG. 2, comprises a nozzle 1, a water absorption ball 10 and a lance body 3, wherein a diaphragm pump 5 and a motor 6 are disposed in the lance body 3, the motor 6 drives the diaphragm pump 5, and the water is driven by the diaphragm pump 5 to be absorbed by the water absorption ball 10, which is then squeezed by the diaphragm pump 5 to jet water out of the nozzle 1.

The water absorption ball 10 is a pendulous water absorption ball and is connected to the diaphragm pump 5 by means of a water inlet pipe 8, and a threaded cover 9 is disposed on the water inlet pipe 8. The water absorption ball 10 is dropped in a liquid container and then sinks, and afterwards, the position of the threaded cover 9 is adjusted along the water inlet pipe 8 to connect the threaded cover 9 to the liquid container in a threaded manner, so that the water absorption ball 10 is prevented from being dragging out of the liquid container in the using process.

The lance body 3 comprises an upper shell 31, a lower shell 32 and a bottom shell 34, wherein the upper shell 31 and the lower shell 32 are connected in a buckled manner, a water outlet 33 is formed in an upper end face of a spaced defined by the upper shell 31 and the lower shell 32, and the bottom shell 34 is disposed on a lower end face of the space and is connected to the upper shell 31 and the lower shell 32 in a buckled manner.

The water inlet pipe 8, a power supply 7, the motor 6, the diaphragm pump 5, a water outlet valve 4, and a water outlet pipe 2 are disposed in the lance body 3 from bottom to top.

The water inlet pipe 8 is formed by a flexible pipe and a rigid pipe which are assembled together, wherein the flexible pipe is conducive to the internal layout of the lance body 3 and traction of a pipe body, and a rubber seal ring is disposed at a joint of the flexible pipe and the rigid pipe to fulfill a sealing effect. The water inlet pipe 8 extends upwards and stretches into the diaphragm pump 5 via a water inlet in the end of the top cover 51 of the diaphragm pump 5. A rubber seal ring is disposed at a joint of the water inlet pipe 8 and the water inlet in the end of the top cover 51 to prevented liquid seepage.

The power supply 7 is disposed on the bottom shell 34 and is connected to the motor 6 by means of a metal ring to supply energy to the motor 6. A slide switch 35 is connected to the motor 6 by means of a micro-switch 37 so as to control the motor 6 to start or stop. After the motor 6 is started, a rotating shaft in the motor 6 rotates to drive a rotating assembly 56 of the diaphragm pump 5 connected to the rotating shaft to rotate, so that the diaphragm pump 5 is driven to move.

Figure 3:
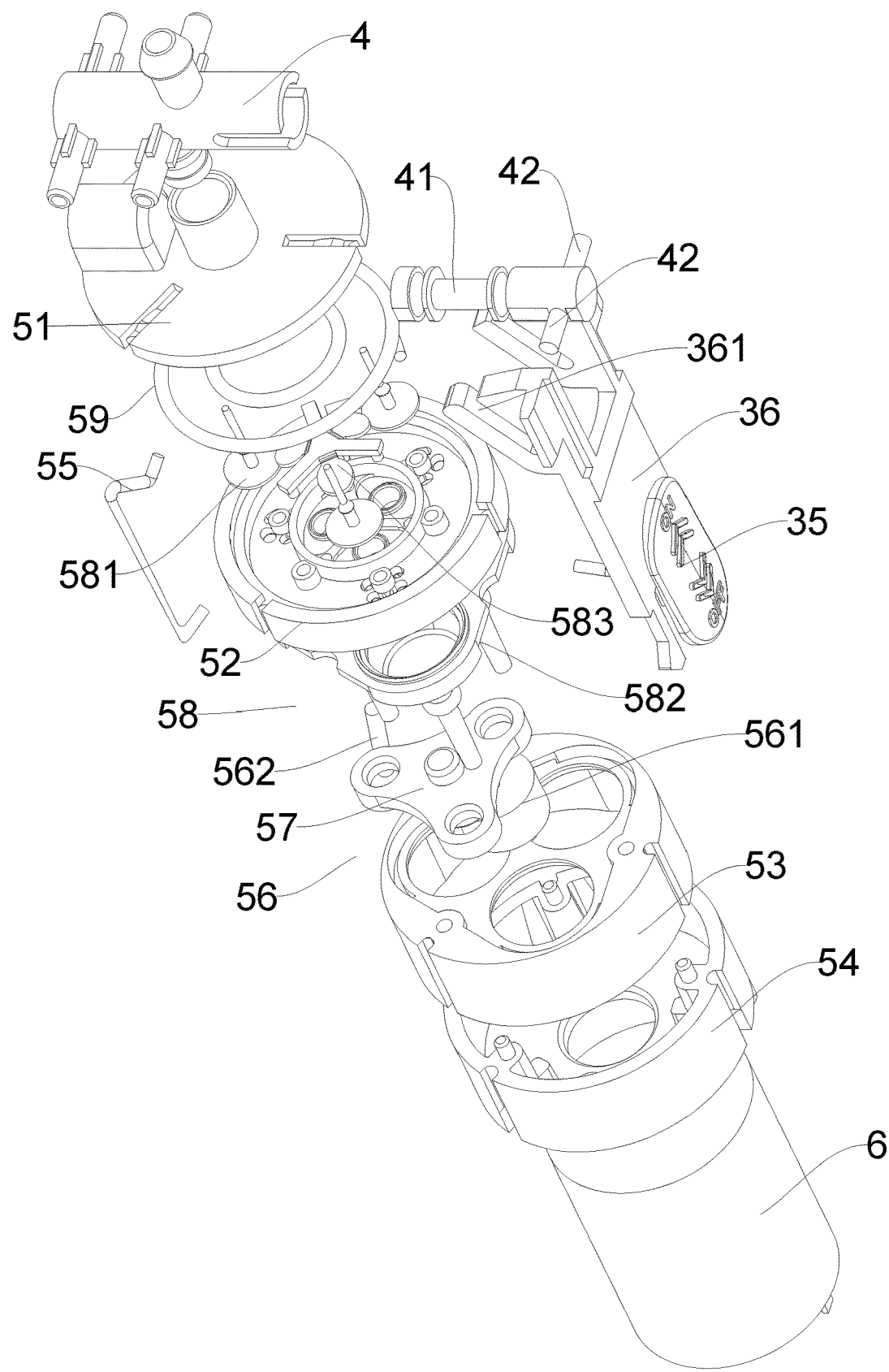
FIG. 3 is an exploded view of a diaphragm pump.

As shown in FIG. 3, the diaphragm pump 5 comprises a housing, the rotating assembly 56, a swing component 57, and a diaphragm assembly 58, wherein one end of the rotating assembly 56 is connected to the motor 6, the other end of the rotating assembly 56 is connected to the diaphragm assembly 58 by means of the swing component 57, and a pump chamber is formed by the diaphragm assembly 58 and the housing and is communicated with the water inlet pipe 8.

The housing comprises the top cover 51, a middle shell, 52, a fixing shell 53 and an outer shell 54 from top to bottom, wherein every two adjacent parts are connected in a buckled manner. The top cover 51 has the water inlet communicated with the water inlet pipe 8 and a port connected to the water outlet valve 4; the pump chamber is defined by the diaphragm assembly 58, the middle shell 52 and the top cover 51, and an elastic gasket 59 is disposed between the diaphragm assembly 58 and the middle shell 52; the fixing shell 53 is provided with multiple diaphragm plates for fixing the diaphragm assembly 58, and a plate part of the diaphragm assembly 58 is closely attached to the diaphragm plates to enable the diaphragm assembly 58 to penetrate through the diaphragm plates to be fixed in the fixing shell 53; and the rotating assembly 56 is disposed in a spaced defined by the outer shell 54 and the motor 6.

The rotating assembly 56 comprises a rotating shaft 561 and a driving shaft 562, wherein the rotating shaft 561 is driven by and connected to the motor 6, a mounting hole is formed in a non-central position of the upper end face of the rotating shaft 561, one end of the driving shaft 562 is inserted into the mounting hole to be connected to the rotating shaft 561, and the other end of the driving shaft 562 is disposed on the axis of the rotating shaft 561 and is located above the rotating shaft 561. When the motor 6 drives the rotating shaft 561 to rotate, the rotating shaft 561 drives the driving shaft 562 to rotate around the axis, and the tracks of the two ends of the rotating shaft 561 are respectively a big circle and a small circle.

The driving shaft 562 is inserted into the lower end face of the swing component 57, and the swing component 57 comprises a connecting part connected to the diaphragm assembly 58 and a protrusion part connected to the driving shaft 562. When the driving shaft 562 rotates, the swing component 57 swings along with the rotation of the driving shaft 562 to drive the diaphragm assembly 58 to move upwards or downwards.

The diaphragm assembly 58 comprises multiple water inlet valve plates 581, a silica gel cavity 582 opposite to the water inlet valve plates 581, and a central water outlet valve plate 583, wherein the silica gel cavity 582 is inserted into the connecting part of the swing component 57 and is connected to the water inlet valve plates 581. The water outlet valve plate 583 is disposed below the water outlet in the center of the pump chamber, is connected to the upper surface of the silica gel cavity 582, and is able to move upwards and downwards. When the silica gel cavity 582 is driven by the swing component 57 to be stretched or squeezed, the volume of a cavity body of the silica gel cavity 582 will be changed. Particularly, when the silica gel cavity 582 is stretched, the volume of the cavity body of is increased, the pressure is decreased, the water inlet valve plates 581 are opened, the water outlet valve plate 583 is closed, and liquid enters the pump chamber from the water inlet pipe 8; and when the silica gel cavity 582 is squeezed, the volume of the cavity body is decreased, the pressure is increased, the water inlet valve plates 581 are closed, the water outlet valve plate 583 is opened, and liquid in the pump chamber is sprayed out of the water outlet pipe 2 by means of the water outlet valve plate 583.

The housing of the diaphragm pump 5 is of a multi-layer structure and is separated from the motor 6, so that replacement of parts in the motor 6 or the diaphragm pump 5 is facilitated, and later maintenance is also facilitated. Every two adjacent components of the housing are connected in a buckled manner. For the sake of further fixing and locking, a plurality of grooves are formed in the circumferential surface of the housing, particularly, in the circumferential surfaces of the top cover 51, the middle shell 52, the fixing shell 53 and the outer shell 54, clamp springs 55 are inlaid in the grooves, and protrusions at the two ends of each clamp spring 55 are inlaid in the housing to restrain rotation and relative movement of all the components of the housing.

The upper end of the diaphragm pump 5 is connected to the water outlet valve 4, and a spacer made of a corrosion-resistant material is disposed between the pump chamber and the water outlet valve 4. The slide switch 35 is connected to a slider 36 formed with a sliding groove 361 and is disposed on the surface of the lance body 3. A rubber seal ring is disposed between a valve body and a valve spool 41 of the water outlet valve 4 to improve the sealing performance of the water outlet valve 4. The valve spool 41 of the water outlet valve 4 is provided with a piston 42, which stretches out of the surface of the valve body of the water outlet valve 4 and is slidably connected to the sliding groove 361. The slider 36 pushes the valve spool 41 by means of the piston to control the on-off state of the water outlet valve 4. When the slide switch 35 is pushed, the slide switch 35 drives the slider 36 to slide to be in contact and connection with the piston 42 so as to drive the piston 42 to move, and then the valve spool 41 is driven to slide in the valve body to allow the diaphragm pump 5 to be communicated with the water outlet pipe 2. Meanwhile, the slider 36 triggers the micro-switch, then the micro-switch 37 is turned on to connect the motor 6 to the power supply 7, and a circuit between the motor 6 and the power supply 7 is closed, so that the diaphragm pump 5 is started to pump liquid. When the slide switch 35 drives the slider 36 to retreat, the piston 42 moves to block the water outlet valve 4, and the micro-switch 37 opens the circuit, accordingly.

As shown in FIG. 1 and FIG. 2, the water outlet valve 4 is communicated with the water outlet pipe 2, which stretches out of the water outlet 33 and extends to be connected to the nozzle 1. The water outlet pipe 2 is made of a soft material and is sleeved with the rigid pipe to control the liquid spraying direction and to facilitate operations.

Figure 4:
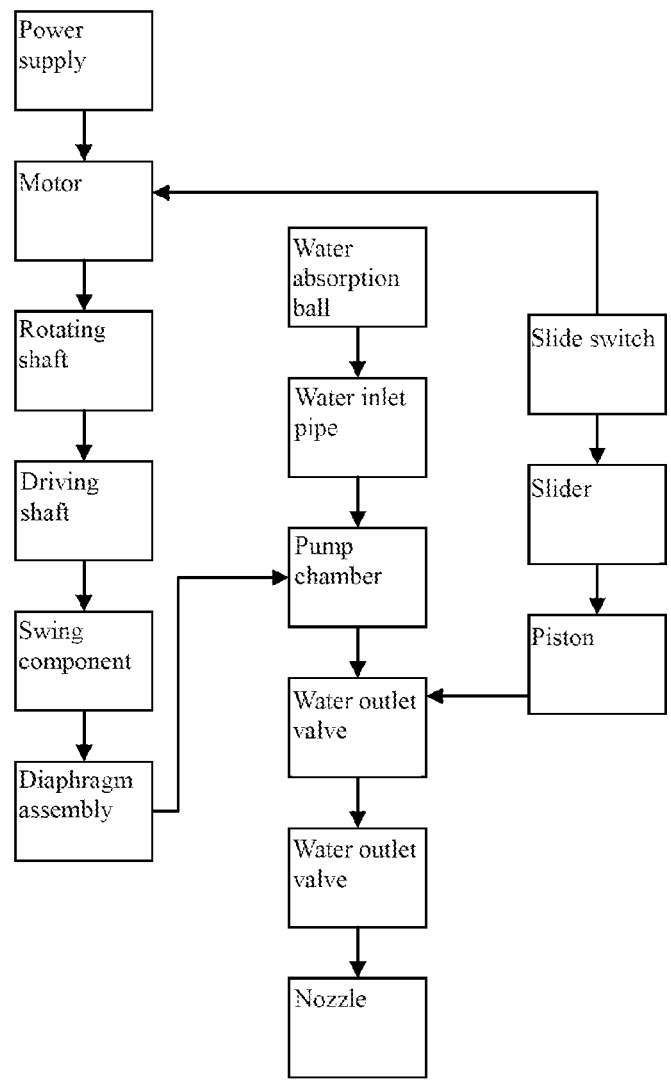
FIG. 4 is a flow diagram of the operating principle of the invention.

As shown in FIG. 4, the water absorption ball 10 is dropped into the liquid container and is fixed by means of the threaded cover 9. The slide switch 35 is pushed to start the motor 6 and to push the slider 36, and then the slider 36 pushes the piston 42 to open the water outlet valve 4; meanwhile, the slider 36 triggers the micro-switch 37 to close the circuit to enable the power supply 7 to supply energy to the motor 6, then the motor 6 drives the driving shaft 562 to rotate by means of the rotating shaft 561, the driving shaft 562 drives the swing component 57 to swing, and the swing component 57 drives the diaphragm assembly 58 to move upwards or downwards to stretch or squeeze the silica gel cavity 582; when the silica gel cavity 582 is stretched, the water inlet valve plates 581 are opened, a negative pressure is formed in the pump chamber, and water in the liquid container is absorbed by the water absorption ball 10 and then enters the pump chamber by means of the water inlet pipe 8; or, when the silica gel cavity 582 is squeezed, the water inlet valve plates 581 are closed, the water outlet valve plate 583 is opened, liquid in the pump chamber is sprayed out of the nozzle 1 by means of the water outlet valve 4 in the open state and the water outlet pipe 2.

The aforesaid embodiments are only preferred ones of the invention, and are not intended to limit the invention. Any modifications, equivalent substitutions and improvements made on the basis of the spirit and principle of the invention should also fall within the protection scope of the invention.

What is claimed is:

1. A water lance provided with diaphragm pump, comprising a nozzle, a lance body and a water absorption ball, wherein a diaphragm pump is disposed in the lance body, one end of the diaphragm pump is connected to the water absorption ball, the other end of the diaphragm pump is connected to the nozzle, the diaphragm pump is detachably connected to a motor and comprises a rotating assembly, a swing component, a diaphragm assembly and a housing, one end of the rotating assembly is connected to the motor, and the other end of the rotating assembly is connected to the diaphragm assembly by means of the swing component, and a pump chamber is formed by the diaphragm assembly and the housing;

the rotating assembly comprises a rotating shaft and a driving shaft, the rotating shaft is connected to the motor, a mounting hole is formed in a non-central position of the upper end face of the rotating shaft, one end of the driving shaft is inserted into the mounting hole to be connected to the rotating shaft, and the other end of the driving shaft is disposed on the axis of the rotating shaft and is located above the rotating shaft, and the motor drives the driving shaft to rotate by means of the rotating shaft, and the tracks of the two ends of the rotating shaft are respectively a big circle and a small circle;

the diaphragm assembly comprises multiple water inlet valve plate, a silica gel cavity opposite to the water inlet valve plate, and a central water outlet valve plate, the water inlet valve plate is disposed above the silica gel cavity, the water outlet valve plate is disposed below a water outlet of the pump chamber, and the silica gel cavity is inserted into a connecting part of the swing component;

a plurality of grooves are formed in a circumferential surface of the housing, and the clamp springs are inlaid in the grooves, and protrusions at the two ends of each clamp spring are inlaid in the housing to restrain rotation and relative movement of all the components of the housing.

2. The water lance provided with a diaphragm pump according to claim 1, wherein the water absorption ball is connected to the diaphragm pump by means of a water inlet pipe.

3. The water lance provided with a diaphragm pump according to claim 1, wherein the nozzle is connected to the diaphragm pump by means of a water outlet pipe, and a water outlet valve is disposed on the water outlet pipe and is connected to a slide switch which controls an on-off state of the water outlet valve.

4. The water lance provided with a diaphragm pump according to claim 3, wherein a valve spool of the water outlet valve is provided with a piston, the slide switch is connected to a slider, and the slider is connected to the piston and pushes the valve spool by means of the piston.

5. The water lance provided with a diaphragm pump according to claim 1, wherein a power supply is disposed in the lance body and is connected to the motor, a micro-switch is disposed in the lance body and is used to connect the motor to the power supply, and a slide switch synchronously drives a water outlet valve and the micro-switch.

6. The water lance provided with a diaphragm pump according to claim 1, wherein the swing component comprises a connecting part connected to the diaphragm assembly and a protrusion part connected to a driving shaft.

7. The water lance provided with a diaphragm pump according to claim 1, wherein the housing comprises a top cover, a middle shell, a fixing shell and an outer shell from top to bottom;

the top cover has a port via which a water inlet pipe is connected to a water outlet valve;

the pump chamber is defined by the diaphragm assembly, the middle shell and the top cover;

the fixing shell is provided with multiple diaphragm plates for fixing the diaphragm assembly, and a plate part of the diaphragm assembly is closely attached to the diaphragm plates to enable the diaphragm assembly to penetrate through the diaphragm plates to be fixed in the fixing shell; and the rotating assembly is disposed in a space defined by the outer shell and the motor.

* * * * *